US008210826B2

(12) United States Patent
Freeman

(10) Patent No.: US 8,210,826 B2
(45) Date of Patent: Jul. 3, 2012

(54) CONTROLLED LIQUID INJECTION AND BLENDING APPARATUS

(76) Inventor: William Freeman, Webster Groves, MO (US)

( * ) Notice: Subject to any disclaimer, the term of this patent is extended or adjusted under 35 U.S.C. 154(b) by 660 days.

(21) Appl. No.: 11/404,241

(22) Filed: Apr. 15, 2006

(65) Prior Publication Data

US 2007/0240649 A1 Oct. 18, 2007

(51) Int. Cl.
F04B 49/06 (2006.01)
F04B 49/04 (2006.01)
(52) U.S. Cl. ............ 417/44.2; 417/18; 417/32; 417/37; 417/42; 417/44.3
(58) Field of Classification Search ............... 222/1, 14, 222/22, 26; 417/18, 88, 32, 292, 36, 38, 417/40, 42, 44.2, 44.3, 213
See application file for complete search history.

(56) References Cited

U.S. PATENT DOCUMENTS

| | | | | |
|---|---|---|---|---|
| 4,037,598 A * | 7/1977 | Georgi | ............................ | 604/65 |
| 5,014,211 A * | 5/1991 | Turner et al. | .................. | 700/239 |
| 5,024,347 A * | 6/1991 | Baldwin | ............................. | 222/1 |
| 5,293,893 A * | 3/1994 | O'Dougherty | ................ | 137/113 |
| 5,344,044 A * | 9/1994 | Hayden et al. | ..................... | 222/1 |
| 5,421,295 A * | 6/1995 | Lemaire et al. | ............ | 123/179.7 |
| 5,433,342 A * | 7/1995 | Luro | ................................ | 222/1 |
| 5,570,743 A * | 11/1996 | Padgett et al. | ................ | 166/285 |
| 5,633,457 A * | 5/1997 | Kilar et al. | ................. | 73/114.45 |
| 6,065,946 A * | 5/2000 | Lathrop | .................... | 417/423.14 |
| 6,290,384 B1 * | 9/2001 | Pozniak et al. | ............... | 366/136 |
| 6,474,769 B1 * | 11/2002 | Imanaka et al. | ................ | 347/19 |
| 6,478,189 B1 * | 11/2002 | Mooney | ............................ | 222/1 |
| 6,568,559 B2 * | 5/2003 | Miller et al. | ...................... | 222/1 |
| 6,672,147 B1 * | 1/2004 | Mazet | ...................... | 73/114.43 |
| 7,007,822 B2 * | 3/2006 | Forshey et al. | ................. | 222/53 |
| 2003/0028285 A1 * | 2/2003 | Zura et al. | ..................... | 700/241 |
| 2003/0145580 A1 * | 8/2003 | Ripper et al. | ................... | 60/286 |
| 2005/0053469 A1 * | 3/2005 | Raghvachari | ............... | 417/44.2 |
| 2005/0077182 A1 * | 4/2005 | Balisky et al. | ................. | 205/82 |
| 2005/0142013 A1 * | 6/2005 | Faries et al. | ............... | 417/477.2 |
| 2005/0222646 A1 * | 10/2005 | Kroll et al. | ...................... | 607/72 |
| 2006/0235348 A1 * | 10/2006 | Callicoat et al. | ............. | 604/4.01 |
| 2008/0092527 A1 * | 4/2008 | Ripper et al. | ................... | 60/286 |

FOREIGN PATENT DOCUMENTS

DE 10 2004 048075 * 4/2006

OTHER PUBLICATIONS

Machine Translation of DE 10 2004 048075.*

* cited by examiner

Primary Examiner — Charles Freay
Assistant Examiner — Christopher Bobish
(74) Attorney, Agent, or Firm — Husch Blackwell LLP

(57) ABSTRACT

A liquid injection and ratio control system is provided for blending an additive into a main flow line at a controlled ratio. The system automatically detects variances in temperature, pressure, and additive concentration and provides compensation thereto. The system also provides for automatic flow detection, calibration responsive to a level gauge, automated data collection, and wireless bi-directional communication.

12 Claims, 2 Drawing Sheets

CONTROLLED LIQUID INJECTION AND BLENDING APPARATUS

TECHNICAL FIELD OF THE INVENTION

Figure 1:
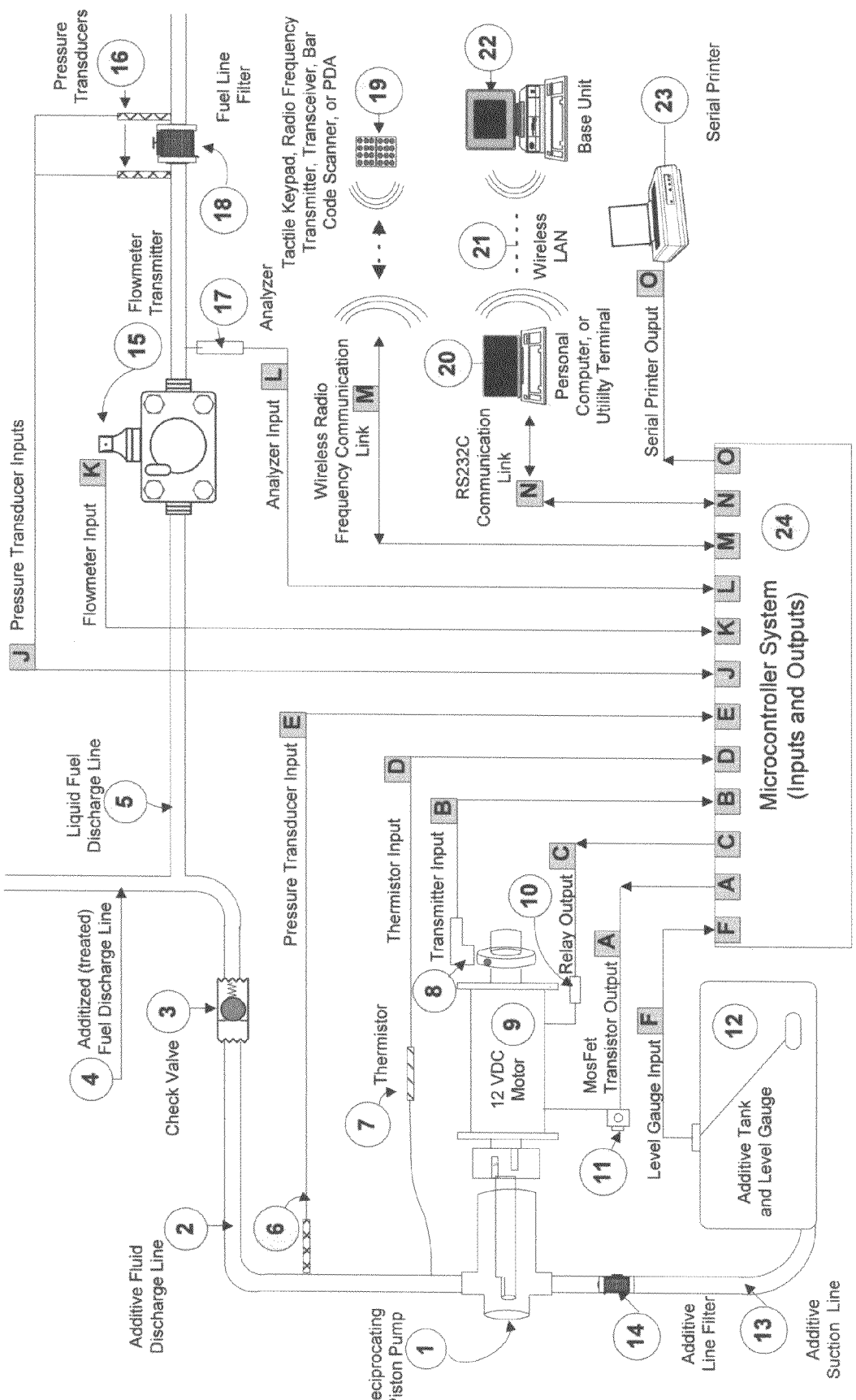

This invention is made for purposes of injecting and continuously blending additive into fuels, such as aviation fuel, gasoline fuel, diesel fuel, natural gas, and propane, by means of a metering pump. The invention also has applications in the food industry, beverage industry, water treatment industry, pharmaceutical industry, chemical industry, and animal feed industry. This invention is also made for the purpose of fueling and defueling trucks. Nevertheless, as obvious to those skilled in the art, the system could be also installed in a refinery or as a static system in any other application requiring liquid additives.

BACKGROUND OF THE INVENTION

1. Prior Art

U.S. Pat. No. 3,179,291 to Umbaugh et al. describes an electromechanical system using a volumetric chamber for calibration purposes. The system uses a main line flowmeter for measuring the volume of additive and manual means for adjusting additive flow. Umbaugh et al. does not teach of automatic means for adjusting additive flow. In fact, it provides no forms of automation, with the exception of a mechanism for starting an additive pump when a fuel line pump is started.

U.S. Pat. No. 3,756,456 to Geogi discusses an optical sensor that senses the movement of a piston in a positive displacement metering pump. To obtain control, Geogi's apparatus employs a hydraulic linear actuator. Nonetheless, Geogi makes no provision for variable flow control.

U.S. Pat. No. 4,601,409 to DiRelolo teaches of utilizing a level detector for monitoring liquid in a reservoir and an aspirator for causing liquid to be drawn into a reservoir. DiRelolo's system includes an on/off switch system for controlling a valve that facilitates in the maintaining of liquid level in the reservoir and the dispensing of chemicals. DiRelolo's system incorporates level signaling means for maintaining fluid level in a container.

U.S. Pat. No. 5,251,785 to Hayden describes a system that utilizes a magnetically coupled flowmeter for measuring additive flow, an infrared transmitter for commanding inputs, and valve means for controlling additive flow. Similarly, U.S. Pat. No. 5,344,044 also to Hayden discusses a system that uses measurement means and control means that are identical to that taught by U.S. Pat. No. 5,251,785.

U.S. Pat. No. 3,386,620 to Smith describes a 2-stage batching system having an electronic control valve.

U.S. Pat. No. 4,353,482 to Tomlinson describes a system that controls the metering of additives by use of a weight detecting device of a second portion of additive as contained in an inventory container. The system also incorporates a flowmeter for measuring additive in a liquid to dry additive system.

U.S. Pat. No. 4,568,248 to Harders teaches a system that employs a flow transducer for measuring additive flow, in which the flow transducer comprises a toroidal tube wherein a number of balls are suspended. Flow of the additive through the toroidal tube causes the balls to progress around the toroidal, and in the process, interrupt a light beam that is used in conjunction with a photoelectric sensor to produce a train of pulses, as successive balls pass the location of the light source. Harders also discusses using a valve for controlling flow.

U.S. Pat. No. 5,118,008 to Williams describes an additive controller that uses a flowmeter for measuring flow rate and a solenoid valve for controlling flow.

The prior art described above suffers various deficiencies in regard to measuring additive flow and controlling additive flow in accordance with changes in certain conditions (e.g. temperature, concentration, and pressure). To be more precise, the prior art does not disclose of a system that provides: means for full continuous proportional blending of additive to fuel flow without the use of a flowmeter; means for temperature compensation of additive; means for gauging additive tank level, to provide verification of additive flow and calibration of an injector pump; pressure detection means for proof of additive flow and detection of empty tank, additive line break, closed additive tank suction valve, blocked filter, or blocked tank vent; means for detecting overpressure or underpressure of an additive injection fluid line; means for controlling a DC motor with a MosFet transistor, such that the amperage draw is below 10 amperes DC while injecting additive into a high pressure fuel line; means for measuring concentrations of additive and accordingly adjusting additive ratio for blend back purposes; means for monitoring fuel filter operation in both the additive line and the fuel line; and means for data collection, wireless bi-directional communication, and production of data.

2. Invention

As discussed below, the system of the present invention overcomes these basic problems challenging prior art systems. Accordingly, there is a need for an additive injection system comprising: a) a pump/motor; b) pressure compensating means; c) temperature compensating means; d) a detector for analyzing additive concentrations, d) a level gauge flow detection; e) level gauge automatic calibration means; f) an automated data collection, and g) a wireless bi-directional communication link. The present invention provides a liquid additive injection system with the above-mentioned features not taught by the prior art.

SUMMARY OF INVENTION

The invention relates to a system for controlling liquid or additive injection into another (e.g. base) liquid through a pump, wherein controls on the pump are used to closely monitor, measure, and control the additives or liquids injected. The additive pump is finely controlled so that precise and minute amounts of additives or liquids may be injected into another (e.g. base) liquid.

Liquid additives are concentrated. The required additive dosage can be as low as 0.10 mL (milliliters) per gallon. Liquids flow through pipelines under pressure. A typical fuel flow rate from a fuel delivery truck can range from 10 to 100 gallons per minute. Thus, the required additive rate is 1 to 10 mL per minute which is a flow rate of additive that falls below conventional measurement means such as positive displacement flowmeters. Miniature flowmeters are available, but they generally require maintenance and are not compatible with the pulsing action of many metering pumps, such as those relating to diaphragm and piston types. Changes in the additive to fuel ratio as slight as 0.01 mL per gallon can affect the predicted outcome of the additive's benefit, and thereby affect engine performance. It is the purpose of this invention to properly measure and inject liquid additives at these low additive flow rates.

Metering pumps are typically used to inject additives under pressure into main liquid streams at flow rates below conventional measurement means. However, as flow rates of the liquids vary in the main liquid stream, the resultant pressure can likewise vary. As pressure varies, so does the load placed on a metering pump. For a pump shaft, this load can be expressed in terms of torque. For an electric motor, the load can be expressed in terms of RPM (Revolutions Per Minute). When the pump is connected to an electric motor, variances and fluctuations in line pressure can alter the amount of load placed on the pump. Likewise, fluctuations in the amount of load placed on the pump will result in fluctuations in the amount of load placed on the motor. Consequently, without compensating means, the motor's (and correspondingly the pump's) performance will fluctuate (speeding up or slowing down depending on the particular load during operation), and thus increase the error margin with regard to the correct amount of additive to be injected into the fuel. Accordingly, changes in line pressure will alter the treat rate of additive.

It is the purpose of this invention to provide a system for maintaining constant motor speed and pump output, in spite of fluctuations in line pressures of an additive injection system, by measuring the additive line pressure and simultaneously monitoring the RPM of an electric motor.

In fueling aircraft and certain motorized vehicles where the additive is critical to engine operation, it is necessary to continuously monitor and instantaneously detect any stoppage or failure of additive or fuel flow during the fueling process. A failure to pump additive would result in a loss of pressure in the additive line. Subsequently, if the additive pump was not pumping and means from preventing backflow failed, a loss of pressure in the additive line would result in the fuel line pressure overcoming the additive line pressure. Accordingly, a stoppage or failure of additive can alone result in failure of the vehicle and cause both the additive and the fuel to backflow into the additive injection fluid line and ultimately into the additive tank. It is the purpose of this invention to monitor the pressure in the additive fluid line, and alarm, or provide a total fuel systems shut down, if the additive is not flowing.

It is also the purpose of this invention to detect an overpressure condition in the additive injection line, as would be the case if the additive pump was pumping while the additive line was closed to the fuel line.

It is a further purpose of this invention to provide means for detecting in the additive line a faulty check or shut-off valve. A positive detection can be achieved when an additive injector is found to be not running while simultaneously a substantial pressure is measured in the additive line. Simply put, if the injector is not running and backpressure is read, a faulty check or shut-off valve would be a detectable cause.

It is the further purpose of this invention to detect low pressure or no flow in an additive injection line. This could occur when the injector pump is running and while the additive tank is empty, while the additive line suction line valve is closed, while an additive filter is blocked, or while the tank vent is blocked.

Any of the aforementioned changes would cause discerning and detectable changes in the discharge pressure of the additive injection line, thereby providing means for identification of the categorical cause of failure.

Fuel is generally pumped out of fuel trucks at high flow rates. This fuel can be pumped out through hydraulic means at pressures as high as 150 psi (pounds per square inch). The power required for pumping additives at low additive flow rates under high pressure for this pumping action is most practically supplied by an electric motor coupled to a pump. This pressure is often high—generally beyond the practical power producing capabilities of a 12 volt vehicle battery—when the additive is pumped at high pressure. (As widely known to those skilled in the art, total power received by an electrical device is measured in watts and equals the arithmetic expression, volts×amps. Thus, a 12 volt power supply at 10 amps would produce 120 watts, whereas a 120 volt power supply at the same amperage would produce 1,200 watts.) It is one preferred embodiment of this invention to inject additive at high pressure by using a fractional horsepower DC motor rated at approximately 1/30th horsepower and having an amp draw of not more than 10 amps at 12 volts DC, or 120 watts at full load. If the vehicle is powered by a 24 volt battery at the same wattage, the amperage draw would be 5 amps at 120 watts. It should be understood that a transformer or a power supply could also be applied, which would accept an input voltage of 120 volts, and produce an output voltage of 12 volts. In this application, the power supply would draw 1 amp at 120 volts, thus producing the 120 watts DC maximum.

As known to those skilled in the art, liquids are sensitive to changes in temperature. Increases or decreases in the temperature of additives will affect the flowing characteristics of a liquid. As a liquid warms, its viscosity will generally decrease. Conversely, as a liquid cools, its viscosity will generally increase. For instance, No. 2 fuel oil, which is commonly burned in turbine engines, has a viscosity of approximately 32 SSU (saybolts seconds universal) at 115 degrees Fahrenheit, which is the same viscosity as that of water at 70 degrees Fahrenheit. However, at −30 degrees Fahrenheit, the same No. 2 Fuel Oil has a viscosity of 250 SSU, which is the same viscosity as that of olive oil at ambient temperature. Similarly, No. 6 fuel oil, which is also burned in turbine engines, also possesses a viscosity property that is the inversely proportional to temperature. For instance, at a temperature greater than 350 degrees Fahrenheit, Fuel No. 6 possesses a viscosity of 43 SSU, which is a similar viscosity to that of blood at ambient temperature. However, this same No. 6 fuel oil at −30 degrees Fahrenheit will possess a viscosity of 50,000 SSU, which is a viscosity level similar to that of honey at ambient temperature. Consequently, changes in the viscosity of liquids will directly affect the capacities of pumps, meters, and valves. As known to those skilled in the art, pump discharge flow rates are inversely proportional to the viscosity of the fluid being pumped. Thus, pump discharge flow rates will decrease when viscosities increase, and conversely pump discharge flow rates will increase when viscosities decrease.

As widely known to those skilled in art, changes in the specific volume (which corresponds to volume/mass) of a liquid will generally occur with changes in fluid temperature. The degree of the specific volume change positively correlates with the extent of the temperature change. Thus, as the temperature of a liquid increases, its specific volume will also increase, leading to an expansion of the liquid. Conversely, as the temperature of a liquid decreases, its specific volume will decrease, leading to a contraction of the liquid. The volume of liquid in a specific volume expands with temperature increases, and contracts with temperature decreases.

Consequently, variations in specific volume will cause changes in the density of a liquids (i.e., changes in the mass per unit volume of a substance) under specified conditions of pressure and temperature.

For these reasons, liquids, gasoline and other fuels, which are sold for retail sale, are required by the National Institute of Standards and Technology to be measured with flowmeters that are temperature-compensated. Gasoline dispensing pumps for example, are inspected regularly by the Departments of Agriculture for accuracy. The flowmeters contained within the gasoline dispenser, fuel terminal facilities, and on fueling trucks, compensate the temperature of the fuel to 60 degrees Fahrenheit, which is referred to as a base temperature and is the standard for most fuel measurement devices used in commerce.

It is the purpose of this invention to automatically correct for changes in density by measuring the temperature of the additive by the use of a thermistor and correcting the measured output in accordance with the extent of deviation from a base temperature.

Motor speed controllers are commonly used to control the speed of direct current electric motors and thereby control the output (i.e., capacity) of a motor-driven pump. These devices commonly operate by applying a variable positive voltage to the positive voltage side of a DC motor. It is another purpose of this invention to provide a mechanism for varying the speed of a fractional horsepower high RPM motor direct current electric motor directly coupled to a high RPM reciprocating piston positive displacement pump by employing an N-Channel MOSFET transistor for controlling the negative (DC minus side) of the positive and negative current path, and thereby providing a control signal means having micro amp. current draw.

Fuel flowmeters are commonly used on fueling trucks to record fuel volume. Many of these flowmeters have transmitters that produce a pulsed output, wherein one pulse is equivalent to a specific volume of fuel. It is the another purpose of this invention to provide electronic means for receiving said pulsed input proportionate to fuel flow volume, said signal to automatically ratio fuel additive to fuel volume, totalize fuel usage, and display fuel flow rate via microcontroller system means on an additive injector system.

All fuels are filtered as they are delivered. Most aircraft fuel filters have coalescing elements, which remove particular solids and water droplets. As these filters become saturated with solids and/or water, the filter's resistance to flow naturally increases. The pressure upstream of the filter can remain constant, or increase, depending upon the design of the pump. However as the filter collects material, the pressure downstream of the filter decreases. This creates a greater pressure drop (differential) between the upstream and downstream pressures of a filter. (The difference between the upstream pressure and the downstream pressures is commonly known as the differential pressure.) Thus, it is extremely important to change filter elements when they reach their capacity to collect material. Failure to do so can result in a filter failure, in which both the filter element and collected material can escape and contaminate the fuel. While there are products commercially available which measure differential pressure across filters and provide alarm by a switching mechanism, these devices can be set for only one alarm point, as they do not compensate for varying flow rates. This can cause problems. For example, a typical filter that is full of material may have a 5 psi pressure differential at 50 gallons per minute flow and a 15 psi pressure differential at 100 gallons per minute flow. As evident to those skilled in the art, a measuring device capable of only a single set point is not universally adequate for a wide-range of fueling operations because fuel flow is proportional to pressure. Consequently, fuel is delivered at many different flow rates as determined by the requirements of the many different vehicles being fueled. The present invention overcomes these problems that challenge prior art systems.

Thus, it is another purpose of this invention to measure the differential pressure across a fuel filter and compensate, for the relationship between fuel flow rate and the differential pressures across the fuel filter, by measuring the differential pressure with pressure transducers and determining when the filter is full, independent of the flow rate through the filter in an additive injection system. Differential pressure readings are measured using pressure transducers 16 with a clean filter element operating under normal operation conditions, and at minimum and maximum fuel flow rates. Thus, the differential pressures relative to fuel flow rates and pressures are known values throughout the entire operating range of the fueling system and can be displayed. The data could also be entered manually where the values for pipe size, filter size, flow rates, pressures, clean filter differential pressures, and full of maximum differential filter pressure are known.

The allowable maximum differential filter pressure above the known normal values is set into (microcontroller 24) as a percent. Thus, the percentage, or maximum allowable excess differential pressure becomes a sliding scale above the normal range. If the maximum allowable differential pressure is exceeded, the system (microcontroller 24) alarms or shuts down the fueling system.

Military aircraft are fueled and defueled in a tactical environment. When an aircraft is properly fueled and the fuel additized, a very specific amount of additive is injected into the fuel and mixed therein. Subsequently, as the aircraft is defueled, the additized fuel is returned back to the fuel truck and mixed with an additized fuel. When the aircraft is to be fueled again, a portion of the fuel is already additized. Accordingly, heretofore the proper specific amount of additive required during the second fueling process would have been unknown. It is another purpose of this invention to provide a method for ensuring that a correct additive to fuel ratio is attained for fueling purposes by measuring concentration of additive in fuel through an analyzer in the fuel supply line and accordingly adding the precise correct amount of additive, thereby avoiding under- and over-compensation of additive injection.

Calibration of additive injectors can be difficult. Currently known systems and methods for attaining precise calibration of additive injectors are rather limited. In many instances, a manual labor-intensive method is adopted. For instance, in common operations today, a reservoir may be installed in a tee on the suction side of the pump. These reservoirs are often configured to have glass sight gauges, wherein a tape with scribe marks and a volumetric scale can be viewed through a sight gauge. The reservoir is then filled with additive, and as the injector is run, the operator makes note of the beginning and ending volume run in time measurements. From these measurements, calculations are performed to determine the pumping rate of the injector pump in units of volume per minute. A similar equivalent method involves running the pump with an open discharge into a measuring cup and thereafter computing the volume per minute. Mechanical and/or electronic adjustments can then be made accordingly, and thus achieve a precise and accurate calibration of the system by ensuring that the injector's output corresponds to the volumetric-container quantity.

Current metering pumps do not contain any means for verifying flow of liquid through the pump. Accordingly, it is the purpose of this invention to provide a level transmitter installed in the additive tank to provide a signal, such that an additive injection pump is constantly monitored and verified for the correct fluid volume and flow. This is accomplished by measuring the level when the pump is turned on and monitoring the gauge signal as additive is pumped out of the additive tank. It is a further purpose of this invention to provide for automatic calibration of an injector pump based upon the filling and dispensing of additive from the additive tank.

Concentrations of additive and the types of additive vary depending upon the type of vehicle. Military tanks, trucks, and various aircrafts may all receive the same fuel but require different additives, or alternatively require the same additive, but at different additive concentrations.

Radio frequency identification tags or bar codes have been typically used in the past to electronically scan and identify vehicles or other fuel recipients such as trucks, aircraft, home heating oil and propane tanks. These methods of scanning data provide identification of the vehicle or customer, which when connected to an electronic database, can provide information relating specifically to that particular fueling recipient, such as the authorized fuel quantity, additive type, and any additive requirements.

This information can be communicated to an additive injector by several automated methods and/or communication links, including:
1. A radio frequency transmitter, transceiver, or bar code scanner communicating via radio frequency directly with a microcontroller in a fuel additive injector system;
2. A PDA or personal computer installed in the cab of a fueling truck communicating via RS232 directly to the microcontroller in a fuel additive injection system; and
3. A base unit communicating via wireless LAN (Local Area Network) to a personal computer or utility terminal installed in the cab of a fueling truck, wherein the personal computer or utility terminal is connected via RS232 directly to the microcontroller of a fuel additive injection system.

Each method communicates the vehicles fueling requirements, including the type of additive, and the additive ratio or treat rate. (The aforementioned methods merely illustrate exemplary communication methods. Alternative equivalent communication methods known to those skilled in the art could also be adopted and are considered within the scope of the invention.)

As fuel is run into the receiving vehicle, the additive injector will inject the correct additive to fuel ratio. When fuel delivery is completed, the microcontroller system of the additive injector will transmit the customer, tank, or receiving number-identified vehicles, the additive treat rate, total fuel usage, total additive usage, transaction number, and date & time to a database using the above-mentioned communication links (2) or (3).

All base units are commonly programmed to transmit information to a larger computer unit, which receives and records each delivery of the daily fueling transactions. Thus, a database is utilized for monitoring all fueled vehicles and tanks and maintaining fuel inventory.

It is the purpose of this invention to provide an additive injection system that:
a) receives additive instructions from a keypad installed on an additive injector's microcontroller system;
b) receives additive instructions from a wireless radio frequency transmitter, transceiver, or bar code scanner directly to the microcontroller in a fuel additive injector system;
c) receives additive instructions from a personal computer installed in the cab of a fueling truck;
d) receives additive instructions from a utility terminal installed in the cab of a fueling truck, connected to base unit via wireless LAN; and
e) transmits customer, tank, or receiving vehicles identification number, additive treat rate, total fuel usage, total additive usage, transaction number, and date & time of each fuel and additive delivery to a serial printer, a personal computer via an RS232C communication link, or a base unit via wireless LAN; said base unit capable of transmitting each and all transaction data to a mainframe database.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

The foregoing summary, as well as the following detailed description of preferred embodiments of the invention, will be understood when read in conjunction with the appended drawings. For the purpose of illustrating the invention, there is shown in the drawings embodiments which are presently preferred. It should be understood, however, that the invention is not limited to the precise arrangements and configurations shown.

FIG. 1 provides a schematic illustration of the flow control system and automated data collection systems.

Figure 2:
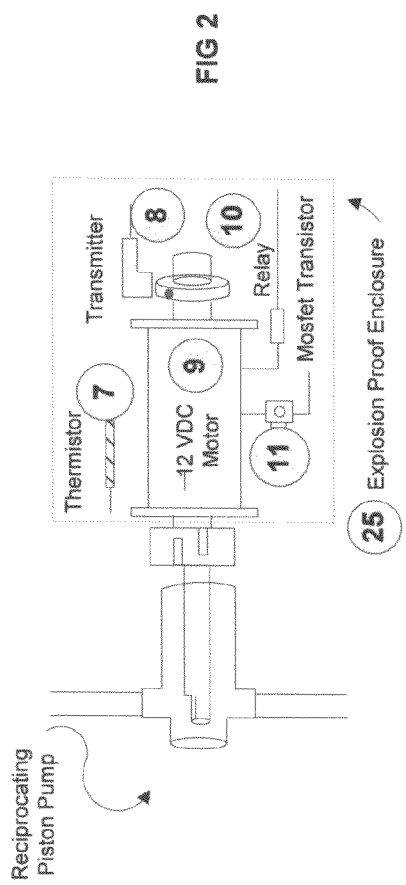

FIG. 2 provides a schematic illustration of the signal inputs and outputs from the additive injector pump, and control relay.

Figure 3:
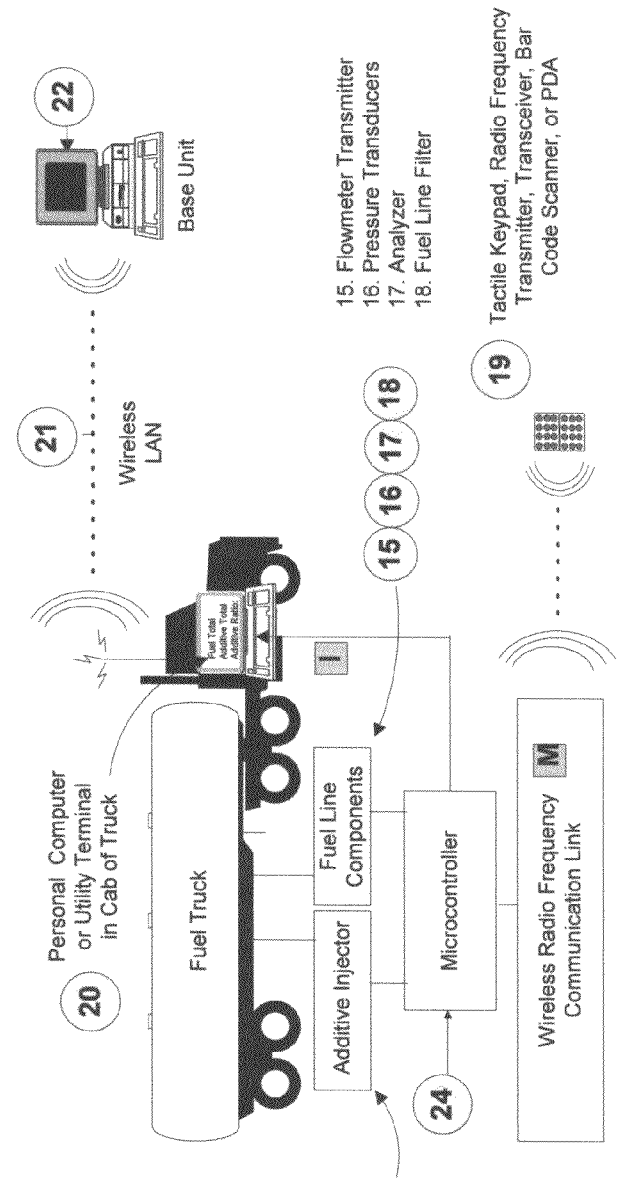

FIG. 3 provides a schematic illustration of the application of the controlled liquid injection and blending apparatus.

DETAILED DESCRIPTION OF THE DRAWINGS

FIG. 1 is a schematic drawing of the invention, illustrating the components connected to the specific embodiments of the present invention. With reference to FIG. 1 of the drawings, fuel or base liquid flow is initiated either by personal computer or utility terminal 20; tactile keypad, radio frequency transmitter, radio frequency transceiver, bar code scanner, or PDA 19; or by mechanical switching means (not shown). The fuel flow is measured through a flowmeter that has a flowmeter transmitter 15 for sending out an output signal proportionate to the flow volume of liquid fuel discharge line 5. The output signal of the flowmeter transmitter 15 temperature-corrects for temperature variances as detected by the flowmeter. Microcontroller 24 input K receives temperature corrected output signal from the flowmeter as a form A frequency, or form C switch closure signal or as multiple pulses per gallon from the flowmeter, or in pulses per measured unit. By calibration means, microcontroller 24 computes single or multiple pulses per gallon of fuel from transmitter 15 into measured units. If the pulse output from flowmeter 15 is not detected by microcontroller system 24 within 3 seconds after the additive injector is started, an alarm or system shut down occurs, indicating that the injector is running but no fuel flow is detected. Analyzer 17 measures additive concentration in liquid fuel discharge line 5 and transmits a voltage signal to microcontroller 24 input L. Thus fuel volume and concentrations of fuel additive are measured accurately in the liquid fuel discharge line 5.

Microcontroller output C actuates relay 10, which starts the 12 VDC motor 9. Additive pump 1 is driven by a 12 VDC motor 9 and pumps additive from additive tank 12 through additive suction line 13 into additive discharge line 2. Pressure rises in additive fluid discharge line 2 above the pressure of liquid fuel discharge line 5, and additive flow is initiated.

Pressure transducer 6 generates a voltage signal proportionate to the pressure in additive fluid discharge line 2 and is received as input E by microcontroller system 24.

If at any time the pressure measured by pressure transducer 6 is below a pre-settable value or below the average value of pressure transducers 16 that are reading the fuel line pressures (i.e., signifying that the additive fluid line has not overcome the pressure in the fuel line and that additive is not flowing), an alarm is initiated by microcontroller system 24 indicating that no additive is flowing.

Conversely, if at any time the additive pressure measured by pressure transducer 6 is above a pre-settable amount (i.e., signifying that the additive injector pump is pumping additive but the additive is not flowing into the fuel line), an alarm is initiated by microcontroller system 24, indicating an overpressure condition.

In addition, if additive pressure is detected by pressure transducer 6 while additive flow has not been activated by microcontroller 24, then there is an indication that a check valve 3 or shut-off valve (not shown) has failed. Thus an alarm in the present invention will be initiated by microcontroller system 24 to indicate a back pressure condition in the additive line.

Thermistor 7 produces a voltage signal proportionate to additive temperature in additive fluid discharge line 2, and is received as input D by microcontroller system 24.

Motor transmitter 8, driven by the shaft of 12 VDC motor 9, generates pulse signal input B into microcontroller system 24 at a pulse rate equal to 1 pulse per revolution of the 12 VDC motor 9. Accordingly, the RPM of the 12 VDC motor 9 is precisely monitored for operation. If microcontroller system 24 closes relay 10 and does not receive a signal from motor transmitter 8, an alarm is initiated by microcontroller 24.

Microcontroller system 24, having input signal K from fuel flowmeter transmitter 15, input signal L from analyzer 17, input signal E from pressure transducer 6, input signal D from thermistor 7, and signal input B from 12 VDC motor transmitter 8, controls the RPM of the 12 VDC motor 9 connected to a pump 1 by varying the pulse width output to MOSFET transistor 11.

The additive flow rate at which the additive flows is determined by measuring the time duration between the pulses (in milliseconds) as produced by the transmitter installed on the pump/motor. Pump 1 and motor transmitter 8 are directly coupled to the shaft of the 12 VDC motor 9. Thus, the signal output of motor transmitter 8 via input B is proportional to the volume produced by pump 1. One revolution of the shaft of pump 1 is equal to a known volume of additive; thus, the total quantity pumped by the pump 1 is known and can be digitally displayed by microcontroller system 24.

Referring to FIG. 2, the 12 VDC motor 9, MOSFET transistor 11, relay 10, transmitter 8, and thermistor 7 are contained in an explosion proof enclosure 25, as is required to inject additives having a flammable or combustible nature.

Referring to FIG. 3, pump 1, check valve 3, thermistor 7, motor transmitter 8, motor 9, relay 10, MOSFET transistor 11, additive tank and level gauge 12, additive line filter 14, flowmeter transmitter 15, pressure transducers 16, analyzer 17, and fuel line filter 18, are typically installed on a fuel truck.

Referring now to FIG. 1, at the beginning of the additized fuel delivery, marked by actuating relay 10, microcontroller system 24 reads tank level in additive tank 12 by level gauge input F. At the end of the additized fuel delivery, marked by deactivating relay 10, microcontroller system 24 reads fuel delivery of additive tank 12 by level gauge input F.

Microcontroller 24, having beginning and ending additive readings, computes the actual volume of additive injected into the additized fuel discharge line 2 by subtracting the ending level reading of additive tank 12 from the beginning reading, resulting in a known volume.

Microcontroller system 24 thereby compares the integrated volume produced by the combinations of pump 1, motor 9, and motor transmitter 8, with the beginning and ending tank level readings produced by the beginning and ending readings of level gauge input F, and corrects, or automatically recalibrates, the integrated volume displayed. The correction factor produced by combining the inputs of the level gauge and pump transmitter are then used by microcontroller system 24 as a calibration factor, thus automatically calibrating the additive injector, eliminating all other manual means of correcting and calibrating an additive injection system.

Referring again to FIG. 1, at the end of the fuel delivery, microcontroller 24 produces transaction information via wireless radio frequency communication link M to 19, or RS232 link N to personal computer or utility terminal 20, or RS232 link N to personal computer or utility terminal 20 to wireless LAN 21 to base unit 22 or to a serial printer in the cab of a truck for paper printing, link O to 23.

Transaction information can include customer, tank, or receiving vehicles identification number; additive treat rate, total fuel usage, total additive usage, transaction number, and date & time of each fuel and additive delivery.

The present invention may be embodied in other specific forms without departing from its spirit or essential characteristics. The described embodiments are to be considered in all respects only as illustrative and not restrictive. Therefore, the scope of the invention is not limited to the specific exemplary embodiment described above. All changes or modifications within the meaning and range of equivalents are intended to be embraced herein.

From the foregoing, it will be apparent to a person skilled in the art that an additive pump system has been developed that will in real time accurately and continuously inject or add small amounts of additives to a flowing base liquid to achieve a constant concentration of additive in the flowing base liquid. Although only a limited number of specific embodiments have been described in detail, such description is not to be taken as a limitation of the present invention. Rather, the scope of the invention is to be defined by the appended claims and their equivalents.

The invention claimed is:

1. An additive injection apparatus for injecting a controlled amount of a first fluid into a stream of a second fluid, comprising:
   a first flowline configured to carry an additive liquid from a source to a second flowline;
   the second flowline configured to carry a base liquid;
   a controlled-volume pump positioned in the first line and configured to pump low levels of the additive liquid into the second flowline, the controlled volume pump comprising a motor configured to control an amount of the additive liquid that is injected into the second flowline, the controlled-volume pump being driven by the motor and a motor transmitter for monitoring RPM of the motor;
   a microcontroller for controlling the operation of the motor in response to input signals from a means for measuring pressure in the first flowline, a means for measuring temperature in the first flowline and said motor transmitter,
   said microcontroller calculating an expected flowrate of additive liquid discharged by the pump based on the RPM of the motor as adjusted by the temperature and pressure information, and adjusting the RPM of said motor such that the expected flowrate of additive liquid discharged by the pump matches the desired flowrate of additive liquid discharged by the pump under the measured temperature and pressure conditions;

a container for holding said additive liquid;

a conduit providing for flow between the container of additive and the pump; and a level gauge for measuring an amount of additive liquid in the container by measuring a level of the additive liquid in the container when the pump is turned on and by monitoring a gauge signal as additive liquid is pumped out of the container, the level gauge sending a container level input signal to the microcontroller, wherein the microcontroller determines a quantity of additive liquid actually discharged by the pump based on difference between a beginning reading and an ending reading of the level gauge based on the container level input signal, and compares the actual quantity of additive liquid discharged with the expected amount of additive discharged, said microcontroller thereby automatically recalibrating its own calculations for the effects of motor RPM, temperature and pressure on the expected additive liquid flowrate from the controlled-volume pump.

2. The additive injection apparatus of claim 1, wherein an electric relay is in communication with an electrical output of the microcontroller and an electrical input of the motor.

3. The additive injection apparatus of claim 2, wherein the motor speed of the motor is controlled by an electrical signal from a MOSFET transistor thereby varying the duty cycle of the ground.

4. The additive injection apparatus of claim 3, wherein the MOSFET transistor receives a duty cycle gate pulse stream signal from the microcontroller.

5. The additive injection apparatus of claim 4, wherein the first flowline comprises a pressure transducer for generating a pressure input signal to the microcontroller.

6. The additive injection apparatus of claim 5, wherein the first flowline further comprises a thermistor for generating a temperature input signal to the microcontroller.

7. The additive injection apparatus of claim 1, wherein the means for measuring pressure in the first flowline is a pressure transducer, and the means for measuring temperature in the first flowline is a thermistor.

8. The additive injection apparatus of claim 1, wherein the motor comprises a transmitter for producing signal to a microcontroller proportionate to motor speed, the motor speed being proportional to a volume dispensed by the pump.

9. An additive injector apparatus comprising:

a first line configured to carry an additive liquid;

a second line configured to carry a base liquid;

a third line configured to be connected to the first line and the second line and to carry discharges of the first line and the second line;

a controlled-volume pump with a RPM-detecting sensor configured to pump low levels of an additive liquid, the controlled-volume pump comprising a motor capable of controlling an amount of the additive liquid that is injected into the second line, the RPM-detecting sensor being configured to monitor RPM of the motor;

a level-detecting sensor configured to measure an amount of additive liquid in an additive container and to provide a measure of a level differential in the additive container between when the controlled-volume pump is started and when the controlled-volume pump is turned off, wherein the level differential is the actual quantity of additive liquid dispensed, the level-detecting sensor sending a container level input signal to an electronic controller; and the electronic controller configured to verify additive flow from the additive container and to automatically recalibrate the controlled-volume pump based upon the difference between the actual quantity of additive liquid dispensed as compared to the expected flowrate of additive liquid calculated from the detected RPM of the motor, as adjusted for temperature and pressure readings measured in the first line, said automatic recalibration adjusting the future calculations of the controller for expected additive liquid flowrate based on RPM of the controlled-volume pump as adjusted for temperature and pressure readings.

10. The additive injection apparatus of claim 9, wherein the electronic controller receives an additive concentration input from an additive concentration detector on the third line, a temperature input from theremistor on the first line, a flow rate input from a flow rate detector on the second line, and calibrates the controlled-volume pump based upon the additive concentration input, the temperature input and the flow rate input, respectively.

11. The additive injection apparatus of claim 9, wherein the electronic controller receives a temperature input from thermistor on the third line and calibrates the controlled-volume pump based upon the temperature input.

12. The additive injection apparatus of claim 9, further comprising:

a transmitter for transmitting information encoded in electromagnetic energy to the electronic controller; a receiver for receiving transmitted information encoded in electromagnetic energy; and a signal processor for decoding information represented in the electromagnetic energy.

* * * * *